(12) United States Patent
Stahl et al.

(10) Patent No.: US 11,923,570 B2
(45) Date of Patent: Mar. 5, 2024

(54) ASSEMBLY FOR AN ELECTROCHEMICAL DEVICE AND METHOD FOR PRODUCING SUCH AN ASSEMBLY

(71) Applicant: ElringKlinger AG, Dettingen (DE)

(72) Inventors: Peter Stahl, Metzingen (DE); Oliver Fink, Metzingen (DE); Karsten Dahl, Owen (DE); Juergen Kraft, Metzingen (DE)

(73) Assignee: EKPO FUEL CELL TECHNOLOGIES GMBH, Dettingen (DE)

( * ) Notice: Subject to any disclaimer, the term of this patent is extended or adjusted under 35 U.S.C. 154(b) by 330 days.

(21) Appl. No.: 17/139,463

(22) Filed: Dec. 31, 2020

(65) Prior Publication Data

US 2021/0135254 A1 May 6, 2021

Related U.S. Application Data

(63) Continuation of application No. PCT/EP2019/067363, filed on Jun. 28, 2019.

(30) Foreign Application Priority Data

Jul. 2, 2018 (DE) ..................... 10 2018 115 994.3

(51) Int. Cl.
*H01M 8/0276* (2016.01)
*H01M 8/0286* (2016.01)
(52) U.S. Cl.
CPC ....... *H01M 8/0276* (2013.01); *H01M 8/0286* (2013.01)

(58) Field of Classification Search
None
See application file for complete search history.

(56) References Cited

U.S. PATENT DOCUMENTS

2006/0093882 A1* 5/2006 Muller ................ H01M 8/0271
29/623.2
2009/0023035 A1 1/2009 Sasaoka
(Continued)

FOREIGN PATENT DOCUMENTS

JP 2008-287910 11/2008

*Primary Examiner* — Alix E Eggerding
(74) *Attorney, Agent, or Firm* — Womble Bond Dickinson (US) LLP

(57) ABSTRACT

An assembly for an electrochemical device is provided, including a gas diffusion layer and a sealing element produced on the gas diffusion layer. The sealing element includes an inner sealing region fixed to the gas diffusion layer and an outer sealing region connected to the gas diffusion layer via the inner sealing region. The assembly has minimal warpage without the temperature in the injection molding tool having to be lowered and/or a geometric pre-compensation of the warpage of the sealing element in the inner sealing region. The sealing element includes a relief region arranged between the inner and outer sealing regions and a) includes a relief opening extending through the sealing element and/or b) has a smallest height ($h_e$), which is smaller than both one fourth of the greatest height ($H_I$) of the inner sealing region and one fourth of the greatest height ($H_A$) of the outer sealing region.

12 Claims, 5 Drawing Sheets

(56) References Cited

U.S. PATENT DOCUMENTS

| | | | |
|---|---|---|---|
| 2009/0155661 A1* | 6/2009 | Morimoto | H01M 8/2457 429/469 |
| 2011/0236786 A1* | 9/2011 | Iizuka | H01M 8/242 429/482 |
| 2015/0167188 A1 | 6/2015 | Hoormann et al. | |
| 2015/0228988 A1 | 8/2015 | Andreas-Schott | |
| 2019/0036130 A1 | 1/2019 | Jilani | |
| 2020/0161673 A1 | 5/2020 | Stahl et al. | |

* cited by examiner

ASSEMBLY FOR AN ELECTROCHEMICAL DEVICE AND METHOD FOR PRODUCING SUCH AN ASSEMBLY

CROSS-REFERENCE TO RELATED APPLICATIONS

This application is a continuation of international application number PCT/EP2019/067363, filed on Jun. 28, 2019, which claims the benefit of German application number 10 2018 115 994.3, filed on Jul. 2, 2018, which are incorporated herein by reference in their entirety and for all purposes.

FIELD OF DISCLOSURE

The present invention relates to an assembly for an electrochemical device that comprises at least one gas diffusion layer and at least one sealing element produced on the gas diffusion layer, wherein the sealing element comprises an inner sealing region fixed to the gas diffusion layer and an outer sealing region connected to the gas diffusion layer via the inner sealing region.

BACKGROUND OF THE INVENTION

Such an assembly may form a constituent part of an electrochemically active unit for the electrochemical device, the electrochemically active unit comprising a membrane and at least one such assembly.

Such an electrochemically active unit may form together with a respective bipolar plate an electrochemical unit of the electrochemical device, which is configured e.g., as a fuel cell device or as an electrolyzer.

The electrochemical device preferably comprises a plurality of electrochemical unit arranged one on top of the other in a stacking direction, as well as preferably two end plates, between which the stack of electrochemical units is arranged and which are braceable against each other by means of a clamping device in order to apply the electrochemical units arranged therebetween and in particular the sealing elements thereof with a clamping force directed along the stacking direction.

In fuel cell devices and in electrolyzers, different media are guided in different planes of an electrochemical unit and, depending on design, in different regions of the same plane. Said media may, in particular, be an anodic fluid (fuel gas), a cathodic fluid (oxidizing agent) and optionally also a fluid cooling agent.

The media to be supplied to the electrochemical device (cathodic fluid, anodic fluid, cooling agent) are supplied to the different planes of the electrochemical device or discharged from the different planes of the electrochemical device by means of a media distribution structure (also called "manifold") with medium supply channels and medium discharge channels, which extend in the stacking direction of the electrochemical device, and must each be supplied from a medium supply channel to the flow field of the respective medium in an electrochemical unit and be discharged from the flow field back into a medium discharge channel. Both the medium supply channels and medium discharge channels as well as the flow fields must thereby be sealed in order to prevent leakage into the outside space of the electrochemical device and between the spaces through which the different media flow.

The media guided through the electrochemical device may neither mix with one another nor exit the electrochemical units, which is why seals are necessary in a plurality of planes.

Said seals may be realized, for example, on the basis of elastomer materials.

In electrochemical units with metallic bipolar plates, the seals can be achieved completely or partially by beads in the bipolar plate or by seals on the basis of elastomer materials.

The bipolar plates (also called separators or interconnectors) may be of one-part configuration or comprise at least two individual layers (bipolar plate layers).

The bipolar plate layers of a multi-layer bipolar plate may be connected together by joining methods like welding or adhesion.

A seal may be inserted as a separate component into the stack of electrochemical units or be fixed to a bipolar plate or to another constituent part of an electrochemical unit, for example to a gas diffusion layer.

If a sealing element is connected directly to a gas diffusion layer, a smooth transition between the seal and the gas diffusion layer is created.

A membrane pressed between two assemblies of in each case a gas diffusion layer and a sealing element is not subjected to excessive voltage peaks.

A cell structure with assemblies of in each case a gas diffusion layer and a sealing element can be constructed very compactly in comparison to a sealing solution with a rim reinforcing arrangement, because no additional space needs to be provided for the overlap between the rim reinforcing arrangement and the membrane electrode arrangement.

The connection of the sealing element to the gas diffusion layer may be effected e.g., in an injection molding process. A gas diffusion layer is thereby placed in a (preferably multi-part) injection molding tool and a sealing material or injection molding material is injection molded around said gas diffusion layer at its outer periphery.

This produces a penetration region at the transition between the gas diffusion layer and the sealing element, in which the injection molding material penetrates a portion of the porous gas diffusion layer.

Said penetration region creates a substance-to-substance and/or positive-locking connection between the gas diffusion layer and the sealing element, such that the gas diffusion layer and the sealing element are mechanically connected to each other sufficiently well during the subsequent assembly steps and during the operation of the electrochemical device.

In the penetration region, the pores of the gas diffusion layer are filled with the injection molding material, which forms the sealing material after curing, such that in this region, the transport of a cathodic fluid or an anodic fluid to the electrochemically active region of the electrochemical unit is impeded. The penetration region should therefore comprise a smallest possible portion of the gas diffusion layer, but should still be large enough to ensure a stable mechanical connection between the gas diffusion layer and the sealing element.

In order to delimit the penetration region on the gas diffusion layer side, the gas diffusion layer, which is mechanically compressible in its thickness direction (in parallel to the stacking direction of the electrochemical device), is locally pressed in an injection molding tool by means of a pressing edge. As a result, the capillary pressure in the pores of the gas diffusion layer rises locally, and the penetration of the gas diffusion layer with the injection molding material is delimited in the x and y directions perpendicular to the thickness direction (z direction).

The pressing edge must press the gas diffusion layer with a minimum pressure to delimit the penetration of the gas diffusion layer with the injection molding material. However, the local pressing of the gas diffusion layer by the pressing edge also may not be too high, as the gas diffusion layer may be damaged upon excessive pressing, for example due to fiber breakage.

The level of penetration of the gas diffusion layer with the injection molding material is dependent on the local pressure, in the respective region of the gas diffusion layer, of the injection molding composition in the injection molding tool. In addition, the degree of penetration of the gas diffusion layer with the injection molding material depends on the viscosity of the injection molding material, on the temperature of the injection molding material (which influences, among other things, the viscosity of the injection molding material) and on the properties of the gas diffusion layer in the region of the pressing edge and in the remaining region of the gas diffusion layer, in particular on the porosity, on the tortuosity (i.e., on the degree of the twistedness of the transport paths within the gas diffusion layer), on the capillary pressure and on the hydrophobization.

Upon the connection of a sealing element to a gas diffusion layer in an injection molding process or a similar method, injection molding material is introduced at an injection point or at a plurality of injection points into the cavity of the injection molding tool and then spreads along flow paths while forming a flow front in the cavity.

The production of the sealing element on the respective gas diffusion layer preferably takes place in an injection molding tool at a temperature, which is typically higher than 100° C. and lower than 200° C.

After the injection molding operation and a heating time for cross-linking the injected sealing material, in particular an elastomer material, the injection molding tool is opened and the assembly of the gas diffusion layer and the sealing element injection molded on the outer rim of the gas diffusion layer is removed from the injection molding tool.

The gas diffusion layer and the sealing material of the sealing element typically have mutually different heat expansion coefficients. The gas diffusion layer normally has a very low (or even negative) heat expansion coefficient, while the sealing element has a very high (positive) heat expansion coefficient. Due to these differences in the heat expansion coefficients, severe warpage of the assembly and mechanical stresses in the assembly may arise.

Further, elastomer materials typically have shrinkage due to the cross-linking, which also contributes to the warpage of the assembly.

The total warpage that is caused by the shrinkage of the sealing element due to the cross-linking and due to the differences in the heat expansion coefficients of the sealing element on the one hand and the gas diffusion layer on the other hand has an effect on the shape both of the gas diffusion layer and of the sealing element.

Both the gas diffusion layer and the sealing element each have a specific rigidity and/or a deformation behavior, which heavily influence the development of warpage.

The geometric design of the sealing element has a large influence on the warpage behavior, the warpage of the inner sealing region, which is located directly in the vicinity of the connection region between the sealing element and the respective gas diffusion layer, having a larger influence on the warpage of the gas diffusion layer than the outer sealing region, which is located far away from the connection region between the sealing element and the gas diffusion layer, because in the case of the inner sealing region, a direct transmission of force between the sealing element and the gas diffusion layer can take place.

The cross section of the sealing element in the inner sealing region has a large influence on the warpage of the assembly, in particular on the warpage of the respective gas diffusion layer, because due to a larger cross section of the sealing element, with the same elongation of the sealing material, a greater force can be applied in a direction perpendicular to the cross section of the sealing element.

Further, the rigidity of the gas diffusion layer has a very large influence on the warpage of the assembly. A high rigidity of the gas diffusion layer leads to reduced warpage of the gas diffusion layer.

The warpage in the assembly of gas diffusion layer and sealing element and the mechanical stresses caused in the assembly may lead to a greatly increased burden in assembling the assemblies during the mounting of the electrochemical device, because both the handling of the components as well as the positioning of the different layers of the electrochemical device (assemblies of in each case a gas diffusion layer and a sealing element, bipolar plates, and membranes) relative to each other are made more difficult. The positioning tolerances achievable in the mounting of the electrochemical device may also significantly increase due to this warpage.

In order to reduce the warpage of the assembly of gas diffusion layer and sealing element, the temperature of the injection molding tool could be lowered, such that the difference between the tool temperature (and thus the temperature of the sealing material upon the cross-linking in the injection molding tool) and the ambient temperature becomes smaller. However, this increases the process time or cycle time of the injection molding operation, because the cross-linking takes places more slowly at the lower temperature.

If the elastomer material used is adapted to a lower cross-linking temperature, its storability over a long period of time (the so-called pot life) would be negatively affected.

A geometric pre-compensation (in German "Bombierung") of the warpage of the sealing element in the thickness direction of the gas diffusion layer, which in the fully mounted electrochemical device corresponds to the stacking direction of the electrochemically active units, within the inner sealing region is disadvantageous, as this may lead to increased expenditure in the injection molding tool, because the parting surfaces of the injection molding tool may differ from (easily produced) planar surfaces, and thus the separation of the different tool parts of the injection molding tool can no longer take place in one plane, which leads to increased tool costs.

Further, such a geometric compensation of the warpage of the sealing element may lead to an increased space requirement.

SUMMARY OF THE INVENTION

In accordance with an embodiment of the invention, assembly for an electrochemical device of the kind stated at the outset is provided which has minimal warpage, without the temperature in the injection molding tool having to be lowered and/or a geometric pre-compensation of the warpage of the sealing element in the inner sealing region having to be provided.

In accordance with an embodiment of the invention, an assembly with the features of the preamble of claim 1 is provided in which the sealing element comprises at least one relief region, which is arranged between the inner sealing region and the outer sealing region and a) comprises a relief opening extending through the sealing element and/or b) has a smallest height ($h_e$), which is smaller than one fourth of the greatest height ($H_I$) of the inner sealing region and is smaller than one fourth of the greatest height ($H_A$) of the outer sealing region.

The height of an element is hereby understood to be the extent thereof in the thickness direction of the gas diffusion layer, which corresponds to the stacking direction of the fully assembled electrochemical device.

The cross section of the region of the sealing element directly connected to the gas diffusion layer is reduced by one or more such sealing regions, such that the force applied to the gas diffusion layer by the shrinkage of the sealing element due to the different heat expansion coefficients and due to the cross-linking of the elastomer material, which force may lead to warpage of the assembly, in particular of the gas diffusion layer, is reduced.

The sealing element is divided by the one or more relief regions between the inner sealing region and the outer sealing region, the inner sealing region being connected directly to the gas diffusion layer and the outer sealing region being separated from the inner sealing region connected directly to the gas diffusion layer by the relief regions.

In a preferred embodiment of the invention, provision is made for the inner sealing region to have a flow field sealing line, which extends around the gas diffusion layer.

Alternatively or in addition hereto, provision is preferably made for the outer sealing region to have at least one medium channel sealing line, which extends around a medium through-opening of the sealing element.

The at least one relief region is preferably arranged between a flow field sealing line and a medium channel sealing line of the sealing element.

A relief opening of a relief region preferably extends along a thickness direction of the gas diffusion layer through the sealing element.

A relief region may be formed (in particular completely) by a relief opening.

The sealing element preferably comprises a plurality of relief regions, which follow one another along a peripheral direction in the gas diffusion layer.

In a particular embodiment of the invention, provision is made for the sealing element to comprise at least one relief region, which extends along a peripheral direction of the gas diffusion layer and is arranged in a corner region of the assembly, in which the peripheral direction of the gas diffusion layer changes its direction by an angle ($\alpha$) of more than 60°, in particular by an angle ($\alpha$) of substantially 90°.

In a particular embodiment of the invention, provision is made for the sealing element to comprise at least one relief region, which extends along a peripheral direction of the gas diffusion layer over a length of less than 50 mm, in particular of less than 20 mm.

In order to avoid the formation of cracks in the sealing material, in particular upon demolding the sealing element from the injection molding tool and upon handling the assembly group, it is favorable if the sealing element comprises at least one relief region, which has at least one rounded end region, preferably at least two rounded end regions.

The at least one rounded end region preferably has a rim with an arcuately curved course.

To avoid cracks in the material of the sealing element, it is particularly favorable if the sealing element comprises at least one relief region, which comprises a base region with a width (b), extending along a peripheral direction of the gas diffusion layer, and at least one end region with a curved rim line, the radius of curvature (R) of which is greater than half of the width (b) of the base region.

In particular, provision may be made for the sealing element to comprise at least one relief region, which comprises two such end regions with a curved rim line, the radius of curvature (R) of which is greater than half of the width (b) of the base region.

The width (b) of the base region is hereby to be understood as the extent thereof perpendicular to the thickness direction of the gas diffusion layer and perpendicular to the peripheral direction of the gas diffusion layer.

The relief region may, in particular, be configured to be substantially dumbbell-shaped in the plan view of the sealing element, seen along the thickness direction of the gas diffusion layer.

The outer sealing region of the sealing element may preferably be formed taking a warpage compensation into account.

In particular, a warpage compensation may be provided along the thickness direction of the gas diffusion layer.

Alternatively or in addition hereto, a lateral warpage compensation may be provided in a plane oriented perpendicular to the thickness direction of the gas diffusion layer.

Such a warpage compensation is also referred to in German as a "Bombierung" or as a geometric pre-compensation and is effected by correspondingly designing the injection molding tool, the contour of the sealing element in the injection molding tool being configured such that the length and position of the respective contour in the injection molding tool minus the shrinkage to be expected due to the cross linking and the shrinkage to be expected due to the thermal distortion correspond to the length and position of the desired contour of the sealing element in the completely cross-linked and cooled assembly.

If the relief region is not formed by a relief opening, which extends, preferably in the thickness direction, through the sealing element, but rather by a reduced height of the relief region, then it particularly favorable if the smallest height ($h_e$) of the relief region is less than one sixth, in particular less than one eighth, of the greatest height ($H_I$) of the inner sealing region and/or less than one sixth, in particular less than one eighth, of the greatest height ($H_A$) of the outer sealing region of the sealing element.

The relief region may be configured, in particular, as a film, in particular as a thin film.

The material thickness of the relief region is preferably less than 100 µm, in particular less than 50 µm.

In a particular embodiment of the invention, provision is made for the assembly to comprise a first gas diffusion layer and a second gas diffusion layer, a first sealing element produced on the first gas diffusion layer, and a second sealing element produced on the second gas diffusion layer, wherein each of the sealing elements comprises an inner sealing region fixed to the respectively associated gas diffusion layer and an outer sealing region connected to the respectively associated gas diffusion layer via the inner sealing region, and wherein each of the sealing elements comprises at least one relief region, which is arranged between the respective inner sealing region and the respective outer sealing region and a) comprises a relief opening extending through the respective sealing element and/or b) has a smallest height ($h_e$), which is smaller than one fourth of the greatest height ($H_I$) of the respective inner sealing region and is smaller than one fourth of the greatest height ($H_A$) of the respective outer sealing region.

In this case, preferably at least one relief region of the first sealing element and at least one relief region of the second sealing element are arranged offset relative to one another such that they do not overlap one another, seen along a thickness direction of the gas diffusion layers. This has the result that no continuous opening arises between the spaces located above or below the assembly in the stacking direction of the electrochemical device. As a result, short circuits in the flow of the fluid media through the electrochemical device and/or unwanted deposits of fluid media are avoided.

The present invention further relates to a method for producing an assembly for an electrochemical device, which comprises at least one gas diffusion layer and at least one sealing element produced on the gas diffusion layer, wherein the sealing element comprises an inner sealing region fixed to the gas diffusion layer and an outer sealing region connected to the gas diffusion layer via the inner sealing region.

In accordance with an embodiment of the invention, a method of the kind stated above is provided, by means of which an assembly is produced that has minimal warpage, without the temperature of an injection molding tool having to be lowered and/or a warpage compensation having to be performed in the inner sealing region of the sealing element.

In accordance with an embodiment of the invention, a method is provided which comprises the following:
producing at least one relief region in the sealing element between the inner sealing region and the outer sealing region;
wherein
a) the relief region comprises a relief opening extending through the sealing element
and/or
b) the relief region has a smallest height ($h_e$), which is smaller than one fourth of the greatest height ($H_I$) of the inner sealing region and is smaller than one fourth of the greatest height ($H_A$) of the outer sealing region.

Particular embodiments of the method in accordance with the invention have already been described above in conjunction with the particular embodiments of the assembly in accordance with the invention.

The method in accordance with the invention is suited in particular for producing the assembly in accordance with the invention for an electrochemical device.

Each relief region may be locally interrupted by webs, in particular made of sealing material. As a result, the mechanical connection between the inner sealing region and the outer sealing region on the two mutually opposing sides of the relief region is affected.

The relief region, in particular the relief opening, preferably has a width of less than 2 mm, in particular at most 1 mm.

Underlying the invention is the concept of locally providing at least one, preferably a plurality of relief regions in a sealing element connected to a gas diffusion layer, in order to reduce the cross section of the sealing material that is directly connected to the gas diffusion layer.

The region of the sealing element, which is decoupled from the gas diffusion layer by the relief region, may be geometrically configured or pre-compensated such that the warpage of the assembly, in particular of the gas diffusion layer, that is caused by the different heat expansion of the material of the gas diffusion layer on the one hand and the material of the sealing element on the one hand and by the shrinkage due to the cross-linking of the elastomeric sealing material is reduced.

The assembly in accordance with the invention is suitable in particular for use in an electrochemical device, which is configured e.g., as a fuel cell device or as an electrolyzer.

If the electrochemical device is configured as a fuel cell device, it is then preferably a polymer electrolyte membrane fuel cell device.

Further features and advantages of the invention are subject matter of the subsequent description and the graphical representation of exemplary embodiments.

BRIEF DESCRIPTION OF THE DRAWINGS

The same or functionally equivalent elements are provided with the same reference numerals in all Figures.

DETAILED DESCRIPTION OF THE INVENTION

Figure 1:
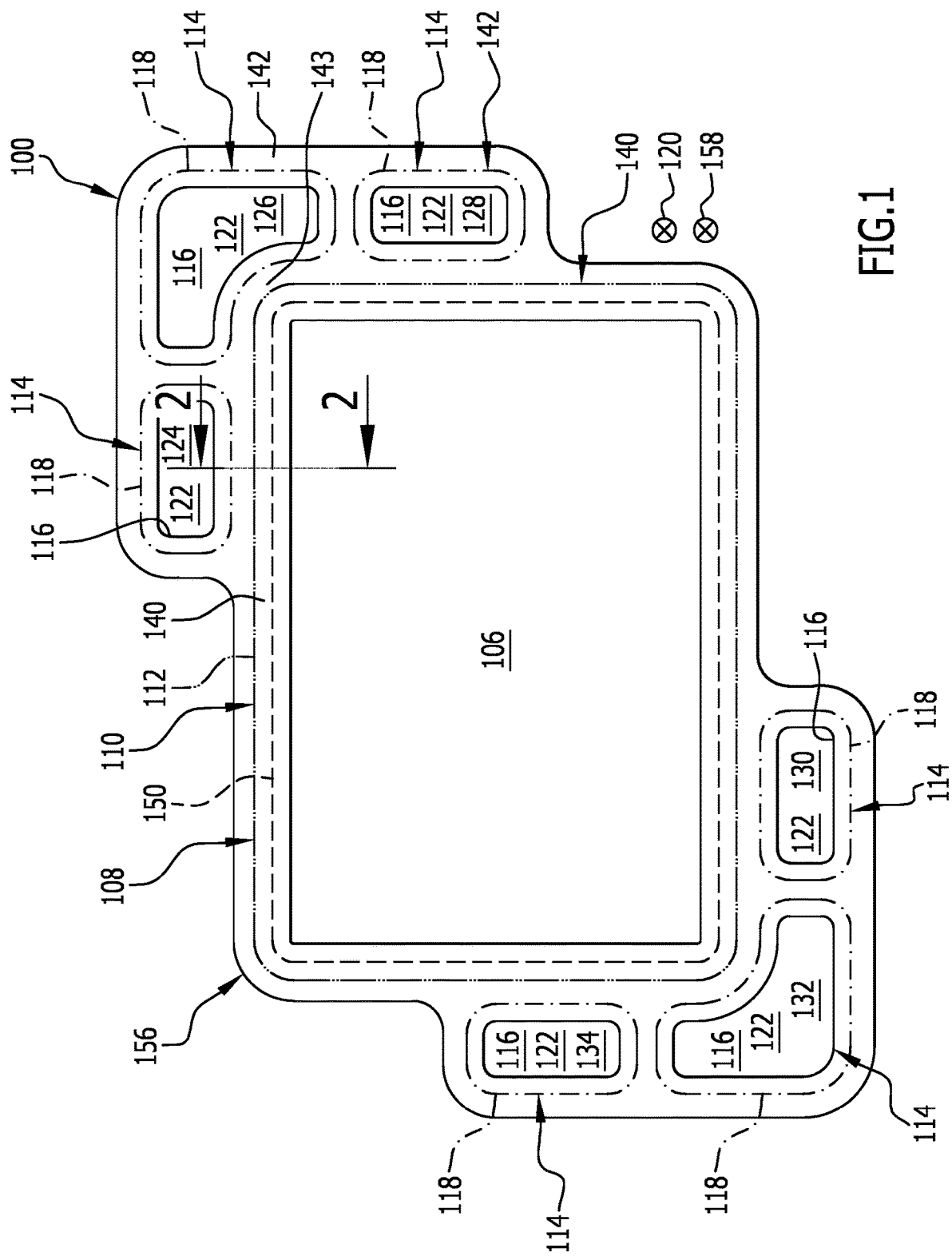
FIG. 1 shows a schematic plan view of an electrochemically active unit for an electrochemical device, which comprises a membrane, two gas diffusion layers, and a sealing system connected to the gas diffusion layers.
Figure 2:
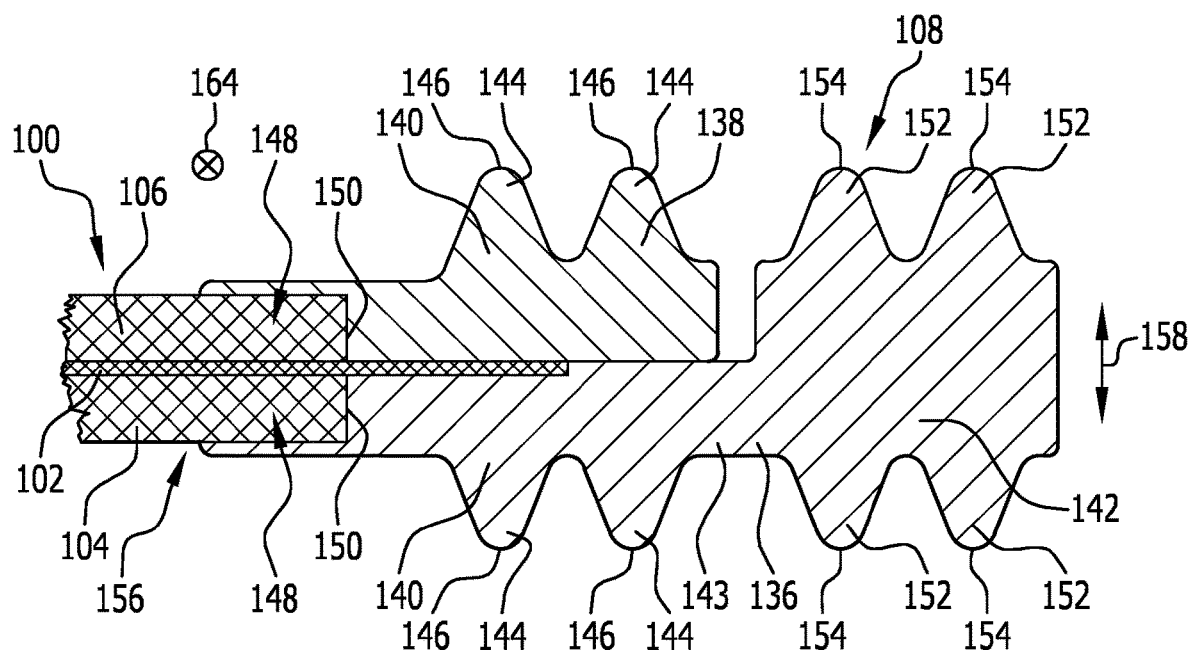
FIG. 2 shows a sectional cross section through the electrochemically active unit from FIG. 1, along line 2-2 in FIG. 1.

An electrochemically active unit, not in accordance with the invention, which is depicted in FIGS. 1 and 2 and is denoted as a whole by 100, for an electrochemical device (not depicted as a whole), for example for a fuel cell device or an electrolyzer, comprises a (for example catalyst-coated) membrane 102, a first gas diffusion layer 104 (arranged e.g., on the anode side), a second gas diffusion layer 106 (arranged e.g., on the cathode side), and a sealing system 108, which prevents undesired leakage of fluid media (in particular a fuel gas, an oxidizing agent, and/or a cooling agent) out of the medium channels ("manifolds") and the flow fields of the electrochemical device.

The sealing system 108 comprises a flow field sealing arrangement 110, which extends around the flow fields in the electrochemically active central region of the electrochemically active unit 100. The sealing line 112 of this flow field sealing arrangement 110 is depicted in the plan view of FIG. 1 by means of a dashed-double point line.

Further, the sealing system 108 comprises a plurality of medium channel sealing arrangements 114, which each extend around a medium channel 116. The sealing lines 118 of said medium channel sealing arrangements 114 are depicted in the plan view of FIG. 1 by means of dot-dash lines.

The medium channels 116 serve to each supply a fluid medium (in the case of a fuel cell device e.g., a fuel gas, an oxidizing agent, or a cooling agent) to the electrochemically active units 100 arranged one on top of the other in a stacking direction 120 of the electrochemical device or to each discharge a fluid medium from the electrochemically active units 100 of the electrochemical device arranged one on top of the other in the stacking direction 120.

Each of the medium channel sealing arrangements 114 encloses a respective medium through-opening 122, which is formed in the sealing system 108 and forms a constituent part of such a medium channel 116.

Depicted in FIG. 1 are, for example, a medium through-opening 124 of a medium channel for residual fuel gas to be discharged, a medium through-opening 126 of a medium channel for cooling agent to be supplied, a medium through-opening 128 of a medium channel for oxidizing agent to be supplied, a medium through-opening 130 of a medium channel for fuel gas to be supplied, a medium through-opening 132 for cooling agent to be discharged, and a medium through-opening 134 for residual oxidizing agent to be discharged.

Thereby, each medium channel for a fluid medium to be supplied to the electrochemical device through an intermediate flow field of the electrochemical device is connected to a respectively associated medium channel for a fluid medium to be discharged from the electrochemical device.

As can be best seen in FIG. 2, the sealing system 108 comprises a first sealing element 136, which is fixed to the (e.g., anode-side) first gas diffusion layer 104, and a second sealing element 138, which is fixed to the (e.g., cathode-side) second gas diffusion layer 106.

The sealing elements 136 and 138 are produced on the respectively associated gas diffusion layer 104 and 106, preferably by means of an injection molding operation.

The sealing elements 136 and 138 preferably comprise an elastomer material and may be formed in particular substantially completely of an elastomer material.

The sealing elements 136 and 138, in the assembled state of the electrochemical device, preferably abut against one another in a fluid-tight manner, without being fixed to one another.

At least one of the sealing elements 136 and 138 comprises an inner sealing region fixed directly to the respectively associated gas diffusion layer 104, 106 and an outer sealing region 142 arranged on the side of the inner sealing region 140 facing away from the respectively associated gas diffusion layer 104, 106, said outer sealing region 142 being connected indirectly to the respectively associated gas diffusion layer 104 or 106 via the inner sealing region 140.

The inner sealing region 140 extends at the rim of the respectively associated gas diffusion layer 104, 106 in an annularly closed manner around the respective gas diffusion layer 104, 106 and forms a constituent part of the flow field sealing arrangement 110.

The outer sealing region 142 extends around one or more medium through-openings 122 of the electrochemically active unit 100 and forms a constituent part of a medium channel sealing arrangement 114 or of a plurality of medium channel sealing arrangements 114.

An intermediate region 143 of the respective sealing element 136, 138 may be arranged between the inner sealing region 140 and the outer sealing region 142.

Each inner sealing region 140 of one of the sealing elements 136, 138 seals on the anode side or on the cathode side along the sealing line 112 of the flow field sealing arrangement 110 by the respective inner sealing region 140 abutting with one or more sealing lips 144, which each have a rounded tip 146, against a bipolar plate (not depicted) of the electrochemical device in a fluid-tight manner.

The sealing line 112 of the flow field sealing arrangement 110, shown in FIG. 1 with a dashed-double point line, does not thereby indicate the exact course of one of the rounded tips 146 of the sealing lips 144 of the inner sealing region 140, but merely symbolizes the course of the sealing lips 144 of the inner sealing region 140, which may have one or more such sealing lips 144.

Each inner sealing region 140 further comprises a respective penetration region 148 that is formed by a portion of the gas diffusion layer 104 and 106 associated with the respective inner sealing region 140, into which portion the sealing material of the respective sealing element 136 and 138 penetrates during the injection molding operation, such that in the cured state of the sealing element 136 and 138, the sealing material thereof penetrates a portion of the porous gas diffusion layer 104 and 106, respectively.

Each penetration region 148 creates a substance-to-substance and/or positive connection between the respective gas diffusion layer 104, 106 and the respectively associated sealing element 136 and 138, such that the respective gas diffusion layer 104, 106 and the respective sealing element 136, 138 are mechanically connected to each other sufficiently well during the subsequent assembly steps and during the operation of the electrochemical device.

The inner sealing region 140 of the respective sealing element 136, 138 projects outward beyond an outer rim 150 of the respective gas diffusion layer 104, 106.

The outer sealing region 142 of each sealing element 136, 138 is arranged on the side of the inner sealing region 140 facing away from the respective penetration region 148.

Each outer sealing region 142 seals along one or more sealing lines 118 of the medium channel sealing arrangements 114 on the anode side and/or on the cathode side by the outer sealing region 142 abutting with one or more sealing lips 152, which each have a rounded tip 154, against a respective bipolar plate (not depicted) of the electrochemical device in a fluid-tight manner.

The sealing lines 118, depicted in dot-dash lines in FIG. 1, of the medium channel sealing arrangements 114 do not thereby indicate the exact course of one of the rounded tips 154 of the sealing lips 152 of the outer sealing regions 142, but merely symbolize the course of the sealing lips 152 of the outer sealing region 142, which in each medium channel sealing arrangement 114 may have one or more respective sealing lips 152 on the anode side and/or on the cathode side.

The sealing lips 152 of the medium channel sealing arrangements 114 may thereby all be associated with the first sealing element 136, all be associated with the second sealing element 138, or be distributed among the first sealing element 136 and the second sealing element 138, for example in such a way that the anode-side sealing lips 152 are arranged on the first sealing element 136 and the cathode-side sealing lips 152 are arranged on the second sealing element 138.

The association of the sealing lips 152 of the medium channel sealing arrangements 114 with the sealing elements 136 and 138 may thereby be selected differently for each medium channel sealing arrangement 114.

Provision may thus be made, for example, that, in a first medium channel sealing arrangement 114, all sealing lips 152 are provided on the first sealing element 136, while in a second medium channel sealing arrangement 114 all sealing lips 152 are provided on the second sealing element 138, and in a third medium channel sealing arrangement 114, the sealing lips 152 are distributed among the two sealing elements 136 and 138.

In the embodiment of an assembly 156 depicted in FIG. 2, the inner sealing region 140 of the first sealing element 136 has the anode-side sealing lips 144 of the flow field sealing arrangement 110, while the outer sealing region 142 of the first sealing element 136 has both the anode-side and the cathode-side sealing lips 152 of the medium channel sealing arrangement 114, which extends around the medium through-opening 124 for fuel gas to be discharged (see FIG. 1).

In this embodiment, the second sealing element 138 has only an inner sealing region 140, which is provided with the cathode-side sealing lips 152 of the flow field sealing arrangement 110.

In this case, associated with each of the sealing lines 112 and 118 both on the anode side and on the cathode side are two respective sealing lips 144 and 152.

The production of the sealing elements 136, 138 on the respective gas diffusion layer 104 and 106 preferably takes place in an injection molding tool at a temperature, which is typically higher than 100° C. and lower than 200° C.

After the injection molding operation and a heating time for cross-linking the injected sealing material, in particular an elastomer material, the injection molding tool is opened and the assembly 156 of the gas diffusion layer 104, 106 and the sealing element 136 and 138, respectively, injection molded on the outer rim of said gas diffusion layer 104, 106 is removed from the injection molding tool.

The gas diffusion layer 104, 106 and the sealing material of the sealing elements 136, 138 typically have mutually different heat expansion coefficients. The gas diffusion layer 104, 106 normally has a very low (or even negative) heat expansion coefficient, while the sealing element 136, 138 has a very high (positive) heat expansion coefficient. Due to these differences in the heat expansion coefficients, severe warpage of the assembly 156 and mechanical stresses in the assembly 156 may arise.

Further, elastomer materials typically have shrinkage due to the cross-linking, which also contributes to the warpage of the assembly 156.

The total warpage that is caused by the shrinkage of the sealing element 136, 138 due to the cross-linking and by the differences in the heat expansion coefficients of the sealing element 136, 138 on the one hand and the gas diffusion layer 104, 106 on the other hand has an effect on the shape both of the respective gas diffusion layer 104, 106, as well as on the respective sealing element 136, 138.

Both the gas diffusion layer 104, 106 and the sealing element 136, 138 each have a specific rigidity and/or a deformation behavior, which heavily influence the development of the warpage.

The geometric design of the sealing element 136, 138 has a large influence on the warpage behavior, wherein the warpage of the inner sealing region 140, which is located directly in the vicinity of the connection region between the sealing element 136, 138 and the respective gas diffusion layer 104, 106, has a greater influence on the warpage of the gas diffusion layer 104, 106 than the outer sealing region 142, which is located far away from the connection region between the sealing element 136, 138 and the gas diffusion layer 104, 106, because in the case the inner sealing region 140, a direct transmission of force between the sealing element 136, 138 and the gas diffusion layer 104, 106 can take place.

The cross section of the sealing element 136, 138 in the inner sealing region 140 has a large influence on the warpage of the assembly 156, in particular on the warpage of the respective gas diffusion layer 104, 106, because due to a larger cross section of the sealing element 136, 138, with the same elongation of the sealing material, a greater force can be applied in a direction perpendicular to the cross section of the sealing element 136, 138.

Further, the rigidity of the gas diffusion layer 104, 106 has a very large influence on the warpage of the assembly 156. A high rigidity of the gas diffusion layer 104, 106 leads to reduced warpage of the respective gas diffusion layer 104 and 106.

The warpage in the assembly 156 and the mechanical stresses caused thereby in the assembly 156 may lead to a greatly increased burden when assembling the assemblies 156 upon the mounting of the electrochemical device, because both the handling of the components as well as the positioning of the different layers of the electrochemical device (assemblies 156 of in each case a gas diffusion layer 104, 106 and a sealing element 136, 138, bipolar plates, and membranes 102) relative to each other are made more difficult. The positioning tolerances achievable in the mounting of the electrochemical device may also significantly increase due to the warpage.

In order to reduce the warpage of the assembly 156 of gas diffusion layer 104, 106 and sealing element 136, 138, the temperature of the injection molding tool could be lowered, such that the different between the tool temperature (and thus the temperature of the sealing material upon introduction into the injection molding tool) and the ambient temperature becomes smaller. However, this increases the process time or cycle time of the injection molding operation, because the cross-linking takes places more slowly at the lower temperature.

If the elastomer material used is adapted to a lower cross-linking temperature, its storability over a long period of time (the so-called pot life) would be negatively affected.

A geometric pre-compensation (in German "Bombierung") of the warpage of the sealing element 136, 138 in the thickness direction 158 of the gas diffusion layer 104, 106, which, in the fully mounted electrochemical device, corresponds to the stacking direction of the electrochemically active units 100, within the inner sealing region 140 is disadvantageous, as this may lead to increased expenditure in the injection molding tool, because the parting surfaces of the injection molding tool may deviate from planar surfaces that are easy to manufacture, and thus the separation of different tool parts of the injection molding tool can no longer take place in a plane, which leads to increased tool costs.

Further, such a geometric pre-compensation of the warpage of the sealing element 136, 138 may lead to an increased space requirement.

Figure 3:
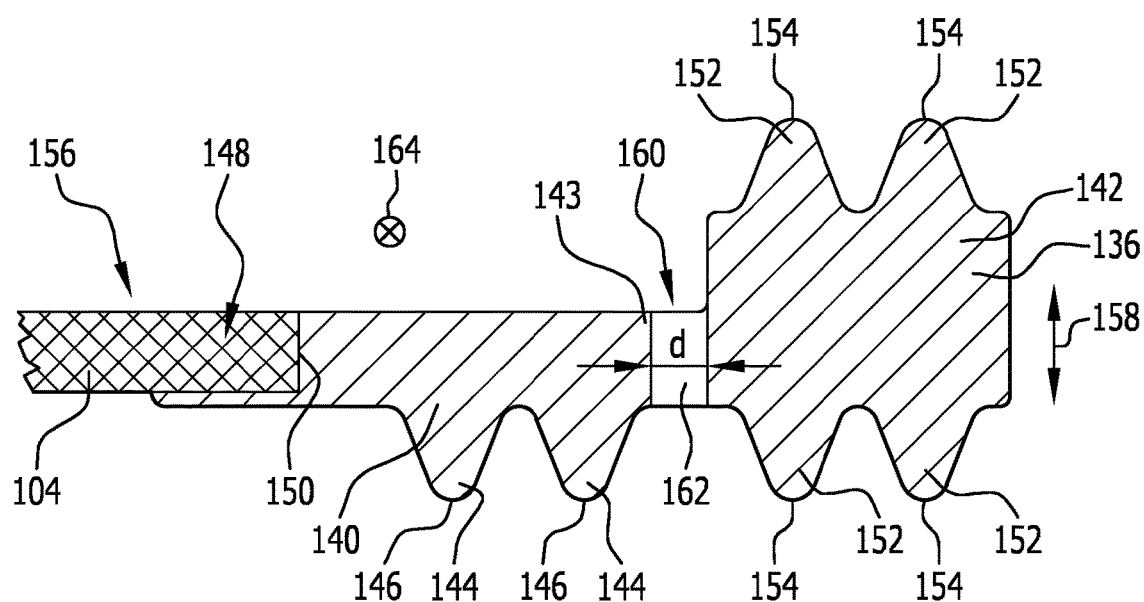
FIG. 3 shows a sectional cross section, corresponding to FIG. 2, through an assembly, which comprises a gas diffusion layer and a sealing element produced on the gas diffusion layer, wherein the sealing element comprises an inner sealing region fixed to the gas diffusion layer and an outer sealing region connected to the gas diffusion layer via the inner sealing region, and wherein the sealing element comprises a relief region, which is arranged between the inner sealing region and the outer sealing region and comprises a relief opening extending through the sealing element.

In order to reduce the warpage in the assembly 156 without these disadvantages, the assembly 156 in accordance with the invention, which is depicted in FIG. 3 in a sectional cross section and comprises the first gas diffusion layer 104 and the first sealing element 136 of the electrochemically active unit 100 described above, comprises a relief region 160, which is arranged in the intermediate region 143 between the inner sealing region 140 and the outer sealing region 142 of the first sealing element 136 and comprises a relief opening 162 extending through the first sealing element 136.

These relief openings 162 extend along the peripheral direction 164 of the gas diffusion layer 104, for example over a length of at most about 50 mm, in particular of at most about 20 mm, and/or over a length of at least about 5 mm, in particular at least about 10 mm.

The width d of the relief opening 162, i.e., the extent thereof perpendicular to the peripheral direction 164 of the gas diffusion layer 104 and perpendicular to the thickness direction 158 of the gas diffusion layer 104, is preferably at most about 5 mm, in particular at most about 3 mm, particularly preferably at most about 2 mm, and/or preferably at least about 50 μm, in particular at least about 100 μm, particularly preferably at least about 200 μm.

A plurality of such relief regions 160 with such relief openings 162 may follow one another along the peripheral direction 164 of the gas diffusion layer 104 and be spaced at a distance from one another in the peripheral direction 164.

As a result of the relief regions 160, the cross section of the region of the sealing element 136 connected directly to the gas diffusion layer 104 is reduced, such that the force applied to the gas diffusion layer 104 by the shrinkage of the sealing element due to the different heat expansion coefficients and due to the cross-linking of the elastomer material, which force may lead to warpage of the assembly 156, in particular of the gas diffusion layer 104, is reduced.

As a result of the relief regions 160, the sealing element 136 is divided between the inner sealing region 140 and the outer sealing region 142, the inner sealing region 140 being connected directly to the gas diffusion layer 104 and the outer sealing region 142 being separated from the inner sealing region 140 connected directly to the gas diffusion layer 104 by the relief regions 160.

Figure 4:
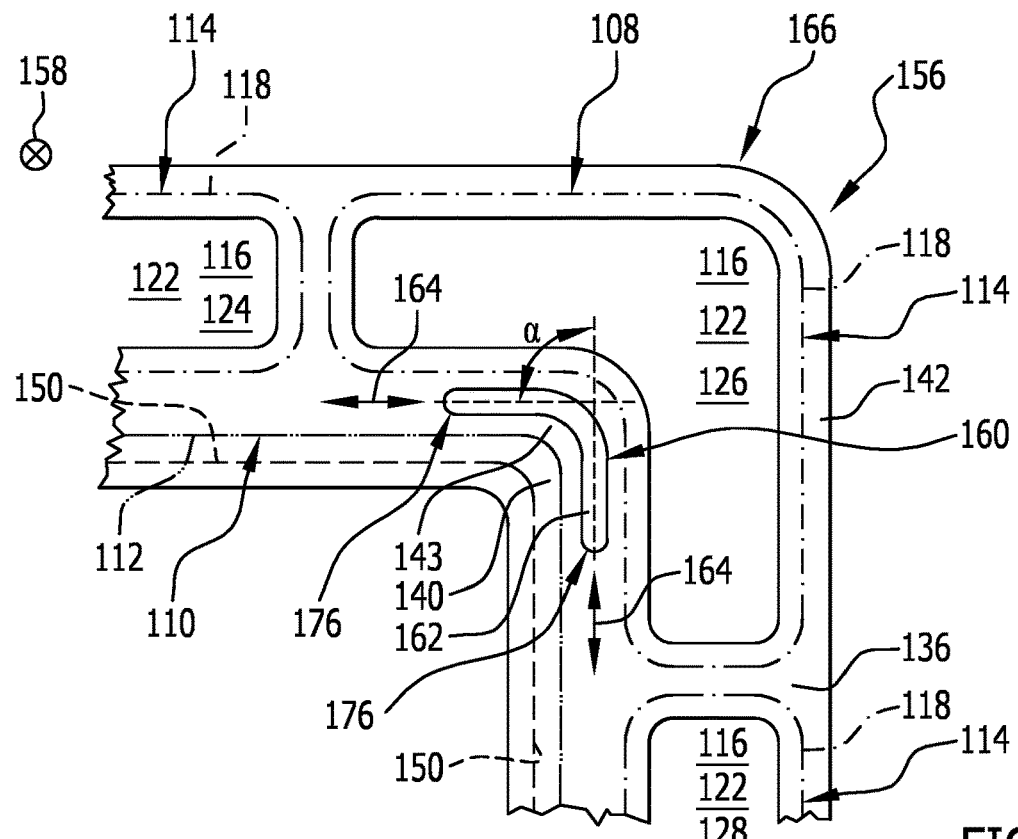
FIG. 4 shows a schematic sectional plan view of a corner region of an assembly that comprises a gas diffusion layer and a sealing element produced on the gas diffusion layer, wherein the sealing element comprises an inner sealing region fixed to the gas diffusion layer and an outer sealing region connected to the gas diffusion layer via the inner sealing region, and wherein the sealing element comprises a relief region, which is arranged between the inner sealing region and the outer sealing region, extends along a peripheral direction of the gas diffusion layer, and is arranged in a corner region of the assembly, in which the peripheral direction of the gas diffusion layer changes its direction by an angle of 90°.

As can be seen in the sectional plan view of FIG. 4, the sealing element 136 of an assembly 156 in accordance with the invention may, in particular, comprise at least one relief region 160 that is arranged in a corner region 166 of the assembly 156, in which the peripheral direction 164 of the gas diffusion layer 104 changes its direction by an angle α of more than 60°, for example by an angle of about 90°.

Such a relief region 160 may, in particular, be arranged between the sealing line 112 of the flow field sealing arrangement 110 and the sealing line 118 of a medium channel sealing arrangement 114, which extends e.g., around a medium through-opening 126 for cooling agent to be supplied or around a medium through-opening 132 for cooling agent to be discharged.

Figure 5:
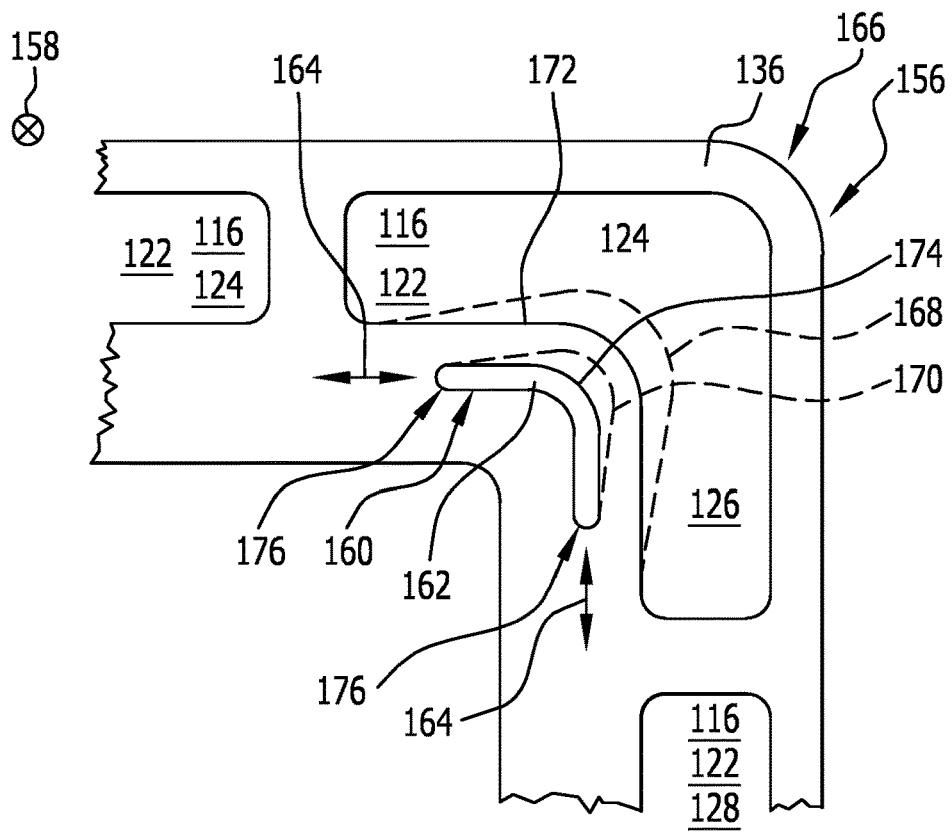
FIG. 5 shows a schematic sectional plan view of a corner region of an assembly that comprises a gas diffusion layer and a sealing element produced on the gas diffusion layer, wherein the sealing element comprises an inner sealing region fixed to the gas diffusion layer and an outer sealing region connected to the gas diffusion layer via the inner sealing region, wherein the sealing element comprises a relief region, which is arranged between the inner sealing region and the outer sealing region, and wherein the outer sealing region is formed taking a warpage compensation into account.

As depicted in FIG. 5, the outer sealing region 142 of the sealing element 136 may preferably be formed taking a warpage compensation into account.

In particular, provision may be made for a geometric pre-compensation of the warpage of the outer sealing region 142 of the sealing element 136 in a plane (corresponding to the drawing plane of FIG. 5) oriented perpendicular to the thickness direction 158 to be provided in the injection molding tool.

In FIG. 5, an inner contour of a medium through-opening 122 of the first sealing element 136 and an outer contour 170 of the relief region 160 are depicted in broken lines as they are formed in the injection molding tool.

As a result of the warpage of the sealing element 136 due to the temperature decrease after the injection molding operation and due to the cross-linking of the elastomer material, the inner contour of the medium through-opening 122 in the completed assembly 156 with the cooled and cross-linked sealing element 136 corresponds to the desired contour 172 depicted in FIG. 5 with a solid line, and the outer contour of the relief region 160 in the completed assembly 156 corresponds to the desired contour 174, also depicted with a solid line in FIG. 5.

Alternatively or in addition to such a pre-compensation or "Bombierung" for a lateral warpage compensation, a warpage compensation may also be provided in the axial direction, i.e., along the thickness direction 158 (corresponding to the stacking direction of the electrochemical device), by means of a geometric pre-compensation, though this may result in an increased manufacturing cost due to a non-planar division of the constituent parts of the injection molding tool.

The contours of the sealing element 136 in the injection molding tool are thereby configured such that the length and position of the contour in the injection molding tool correspond to the length and the position of the desired contour of the sealing element 136 in the completed assembly 156, while taking into account the expected shrinkage due to the cross-linking and the expected shrinkage due to the thermal distortion.

As can be seen in FIGS. 4 and 5, the relief region 160 preferably has a rounded end region 176 and particularly preferably has two rounded end regions 176 facing away from one another.

Said end regions 176 delimit the respective relief region 160 along the peripheral direction 164 of the gas diffusion layer 104.

As a result of the arcuately curved course of the rim of the relief region 160 in the at least one end region 176, the formation of cracks in the sealing material, in particular upon demolding the sealing element 136 from the injection molding tool and/or in handling the assembly 156, is avoided.

Figure 6:
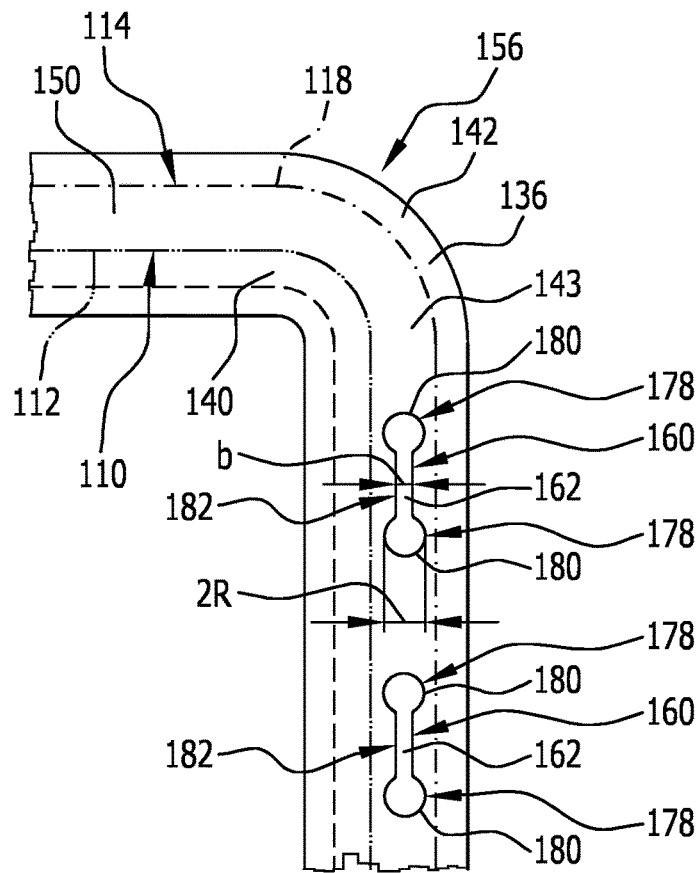
FIG. 6 shows a schematic sectional plan view of an assembly, which comprises a gas diffusion layer and a sealing element produced on the gas diffusion layer, wherein the sealing element comprises an inner sealing region fixed to the gas diffusion layer and an outer sealing region connected to the gas diffusion layer via the inner sealing region, wherein the sealing element comprises two relief regions, which are arranged between the inner sealing region and the outer sealing region, and wherein the relief regions are of dumbbell-shaped configuration, seen in the plan view along the thickness direction of the gas diffusion layer.

To avoid such cracks in the material of the sealing element 136, it is particularly favorable if the relief region 160 is of substantially dumbbell-shaped configuration in the plan view of the sealing element 136 along the thickness direction 158 of the gas diffusion layer 104 (see FIG. 6), i.e., comprises two end region 178, which each have a curved rim line 180, the radius of curvature R of which is greater than half the width b of a base region 182 of the relief region 160 located between the end regions 178, said base region 182 connecting the two end regions 178 together.

The width b of the base region 182 is hereby to be understood as the extent thereof perpendicular to the thickness direction 158 of the gas diffusion layer 104 and perpendicular to the peripheral direction 164 of the gas diffusion layer 104.

Figure 7:
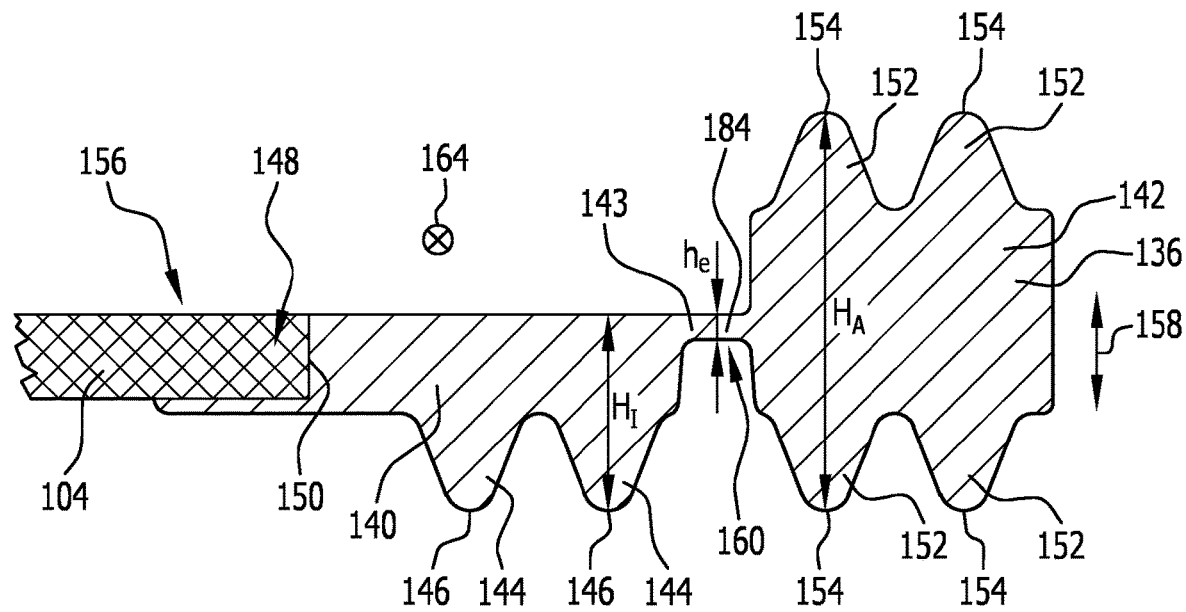
FIG. 7 shows a sectional cross section through an assembly, which comprises a gas diffusion layer and a sealing element produced on the gas diffusion layer, wherein the sealing element comprises an inner sealing region fixed to the gas diffusion layer and an outer sealing region connected to the gas diffusion layer via the inner sealing region, wherein the sealing element comprises a relief region, which is arranged between the inner sealing region and the outer sealing region and is configured as a film with a material strength of preferably less than 100 µm.

At least one of the relief regions 160 of an assembly 156 in accordance with the invention may be formed, instead of by a relief opening 162 passing through the sealing element 136 in the thickness direction 158 of the gas diffusion layer 104, by the respective relief region 160 having a smallest height $h_e$, which is smaller than one fourth of the greatest height $H_I$ of the inner sealing region 140 and less than one fourth of the greatest height $H_A$ of the outer sealing region 142 of the sealing element 136, as depicted in FIG. 7.

By means of such a reduction of the height of the intermediate region 143 between the inner sealing region 140 and the outer sealing region 142 of the sealing element 136, it is achieved that the force applied to the gas diffusion layer 104 as a result of the shrinkage of the sealing element 136 upon cross-linking and cooling, which may lead to warpage of the assembly 156, in particular of the gas diffusion layer 104, is reduced.

The smallest height $h_e$ of the relief region 160 is preferably less than one sixth, in particular less than one eighth, of the greatest height $H_I$ of the inner sealing region 140 and/or less than one sixth, in particular less than one eighth, of the greatest height $H_A$ of the outer sealing region 142 of the sealing element 136.

The relief region 160 may be configured, in particular, as a film 184, in particular as a thin film.

The material thickness $h_e$ of the relief region 160 is preferably less than 100 μm, in particular less than 50 μm.

Figure 8:
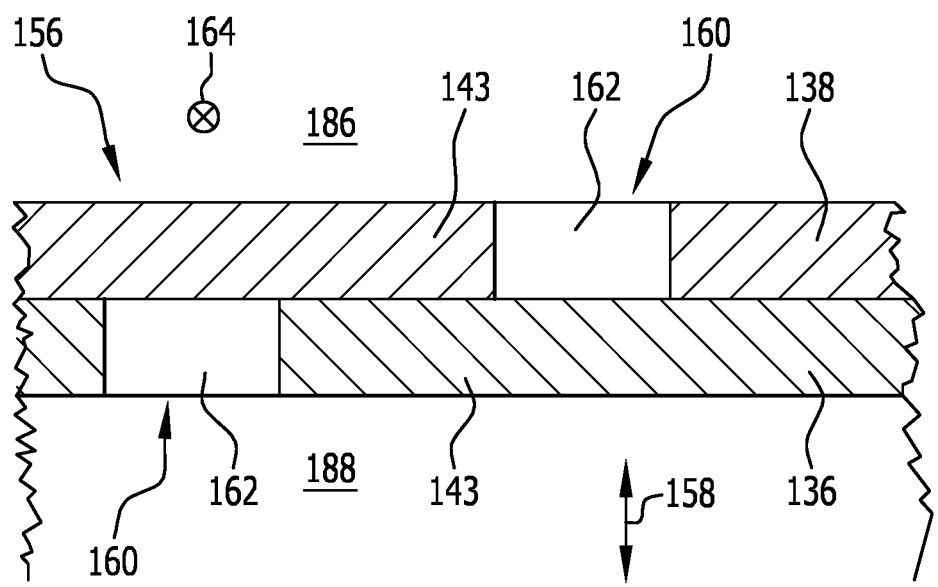
FIG. 8 shows a schematic cross section through an assembly, which comprises two gas diffusion layers and two sealing elements each produced on one of the gas diffusion layers, wherein each of the sealing elements comprises an inner sealing region fixed to the respectively associated gas diffusion layer and an outer sealing region connected to the respectively associated gas diffusion layer via the inner sealing region, and wherein each of the sealing elements comprises at least one relief region, which is arranged between the respective inner sealing region and the respective outer sealing region and comprises a relief opening extending through the respective sealing element, wherein a relief region of the one sealing element and a relief region of the other sealing element are arranged offset relative to one another, such that they do not overlap one another, seen along the thickness direction of the gas diffusion layers.

FIG. 8 shows a sectional cross section through the intermediate regions 143 of a first sealing element 136 and a second sealing element 138 in a further embodiment of an assembly 156 in accordance with the invention, in which both sealing elements 136 and 138 each have an inner sealing region 140 and an outer sealing region 142 and each have at least one relief region 160 arranged in an intermediate region 143 between the inner sealing region 140 and the outer sealing region 142.

The relief regions 160 thereby each comprise a relief opening 162, which extends in the thickness direction 158 of the respective gas diffusion layer 104, 106 through the respective sealing element 136, 138.

As can be seen in FIG. 8, the relief regions 160 of the two sealing elements 136 and 138 are arranged laterally, i.e., perpendicular to the thickness direction 158 of the gas diffusion layers 104 and 106 and perpendicular to the peripheral direction 164 of the gas diffusion layers 104 and 106, offset from one another, such that the relief openings 162 do not overlap one another, seen in the thickness direction 158, and thus no continuous opening arises between the spaces 186 and 188 located above or below the assembly 156 in the stacking direction of the electrochemical device. As a result, short circuits in the flow of the fluid media through the electrochemical device and/or unwanted deposits of fluid media are avoided.

The invention claimed is:

1. An assembly for an electrochemical device, comprising at least one gas diffusion layer and at least one sealing element produced on the gas diffusion layer,
    wherein the sealing element comprises an inner sealing region fixed to the gas diffusion layer and an outer sealing region connected to the gas diffusion layer via the inner sealing region,
    wherein the inner sealing region has a flow field sealing line, which extends around the gas diffusion layer,
    wherein the outer sealing region has at least one medium channel sealing line, which extends around a medium through-opening of the sealing element,
    wherein the sealing element comprises at least one relief region, which is arranged between the flow field sealing line of the inner sealing region and the at least one medium channel sealing line of the outer sealing region and
    a) comprises a relief opening extending through the sealing element
    and/or
    b) has a smallest height, which is smaller than one fourth of the greatest height of the inner sealing region and is smaller than one fourth of the greatest height of the outer sealing region;
    wherein the sealing element comprises a plurality of relief regions, which follow one another along a peripheral direction of the gas diffusion layer.

2. The assembly in accordance with claim 1, wherein the sealing element comprises at least one relief region, which extends along a peripheral direction of the gas diffusion layer and is arranged in a corner region of the assembly, in which the peripheral direction of the gas diffusion layer changes its direction by an angle of more than 60°.

3. The assembly in accordance with claim 1, wherein the sealing element comprises at least one relief region, which extends along a peripheral direction of the gas diffusion layer over a length of less than 50 mm.

4. Assembly in accordance with claim 1, wherein the sealing element comprises at least one relief region, which at least one relief region has at least one rounded end region.

5. The assembly in accordance with claim 1, wherein the sealing element comprises at least one relief region, which comprises a base region with a width, extending along a peripheral direction of the gas diffusion layer, and at least one end region with a curved rim line, the radius of curvature of which is greater than half of the width of the base region.

6. The assembly in accordance with claim 1, wherein the outer sealing region is formed taking a warpage compensation into account.

7. The assembly in accordance with claim 6, wherein a warpage compensation is provided along a thickness direction of the gas diffusion layer.

8. The assembly in accordance with claim 6, wherein a warpage compensation is provided in a plane oriented perpendicular to a thickness direction of the gas diffusion layer.

9. The assembly in accordance with claim 1, wherein at least one relief region is configured as a film with a material thickness of less than 100 μm.

10. The assembly in accordance with claim 1, wherein the assembly comprises a first gas diffusion layer and a second gas diffusion layer, a first sealing element produced on the first gas diffusion layer, and a second sealing element produced on the second gas diffusion layer,
wherein each of the sealing elements comprises an inner sealing region fixed to the respectively associated gas diffusion layer and an outer sealing region connected to the respectively associated gas diffusion layer via the inner sealing region, and
wherein each of the sealing elements comprises at least one relief region, which is arranged between the respective inner sealing region and the respective outer sealing region and
a) comprises a relief opening extending through the respective sealing element
and/or
b) has a smallest height, which is smaller than one fourth of the greatest height of the respective inner sealing region and is smaller than one fourth of the greatest height of the respective outer sealing region.

11. The assembly in accordance with claim 10, wherein at least one relief region of the first sealing element and at least one relief region of the second sealing element are arranged offset relative to one another such that they do not overlap one another, seen along a thickness direction of the gas diffusion layers.

12. A method for producing an assembly for an electrochemical device, which comprises at least one gas diffusion layer and at least one sealing element produced on the gas diffusion layer, wherein the sealing element comprises an inner sealing region fixed to the gas diffusion layer and an outer sealing region connected to the gas diffusion layer via the inner sealing region,
wherein the inner sealing region has a flow field sealing line, which extends around the gas diffusion layer, and
wherein the outer sealing region has at least one medium channel sealing line, which extends around a medium through-opening of the sealing element,
wherein the method comprises the following:
producing at least one relief region in the sealing element between the flow field sealing line of the inner sealing region and the at least one medium channel sealing line of the outer sealing region;
wherein
a) the relief region comprises a relief opening extending through the sealing element
and/or
b) the relief region has a smallest height, which is smaller than one fourth of the greatest height of the inner sealing region and is smaller than one fourth of the greatest height of the outer sealing region;
wherein the sealing element comprises a plurality of relief regions, which follow one another along a peripheral direction of the gas diffusion layer.

\* \* \* \* \*